United States Patent
Kim

(10) Patent No.: US 9,664,595 B2
(45) Date of Patent: May 30, 2017

(54) ENGINE RPM MONITORING METHOD USING MODE OF PRIORITY AND ENGINE RPM MONITORING CONTROLLER THEREFORE

(71) Applicants: Hyundai Motor Company, Seoul (KR); Kia Motors Corporation, Seoul (KR)

(72) Inventor: Seung-Bum Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 314 days.

(21) Appl. No.: 14/555,789

(22) Filed: Nov. 28, 2014

(65) Prior Publication Data

US 2016/0003709 A1    Jan. 7, 2016

(30) Foreign Application Priority Data

Jul. 7, 2014  (KR) .................. 10-2014-0084291

(51) Int. Cl.
  *G01M 15/04*  (2006.01)
  *F02D 41/04*  (2006.01)

(52) U.S. Cl.
  CPC ......... *G01M 15/046* (2013.01); *F02D 41/045* (2013.01)

(58) Field of Classification Search
  CPC ........................... G01M 15/046; F02D 41/045
  USPC .................. 123/351, 436; 73/114.24, 114.25
  See application file for complete search history.

(56) References Cited

U.S. PATENT DOCUMENTS

| | | | | |
|---|---|---|---|---|
| 4,697,561 A | * | 10/1987 | Citron ................. | F02D 41/0085 123/339.14 |
| 4,836,016 A | * | 6/1989 | Nakano ................. | F02D 41/185 377/20 |
| 5,951,617 A | * | 9/1999 | Shinohara ............. | G01M 15/11 123/436 |
| 7,930,929 B2 | * | 4/2011 | Galtier ................. | F02B 77/087 73/114.25 |

FOREIGN PATENT DOCUMENTS

JP    05-010165    1/1993
JP    08-329296    12/1996
(Continued)

*Primary Examiner* — Erick Solis
(74) *Attorney, Agent, or Firm* — Mintz Levin Cohn Ferris Glovsky and Popeo, P.C.; Peter F. Corless

(57) ABSTRACT

An ERM method is provided that uses a mode of priority, when engine monitoring is performed during a key on. In addition, engine stall and RPM sudden increase are determined based on a revolution per minute (RPM) of an engine. A storage priority decision of a first D_RPM Data associated with the engine stall and a second D_RPM Data associated with the RPM sudden rise is performed and a prioritized one of the first D_RPM Data and the second D_RPM Data is stored as new data of an engine RPM monitoring data memory 30. Further, utilization of ERM data memory is increased by deleting previously stored data, and in particular, second D_RPM Data B1-B10 and first D_RPM Data A1-A10 subdivided after and before the RPM sudden increase and after and before the engine stall are used to more accurately determine causes of the engine stall.

18 Claims, 7 Drawing Sheets

(56) References Cited

FOREIGN PATENT DOCUMENTS

| JP | 2004-044407 A | 2/2004 |
| JP | 2004-324599 A | 11/2004 |
| JP | 2007-040225 A | 2/2007 |
| KR | 10-2006-0079818 | 7/2006 |
| KR | 10-1328514 B1 | 11/2013 |

* cited by examiner

FIG.2

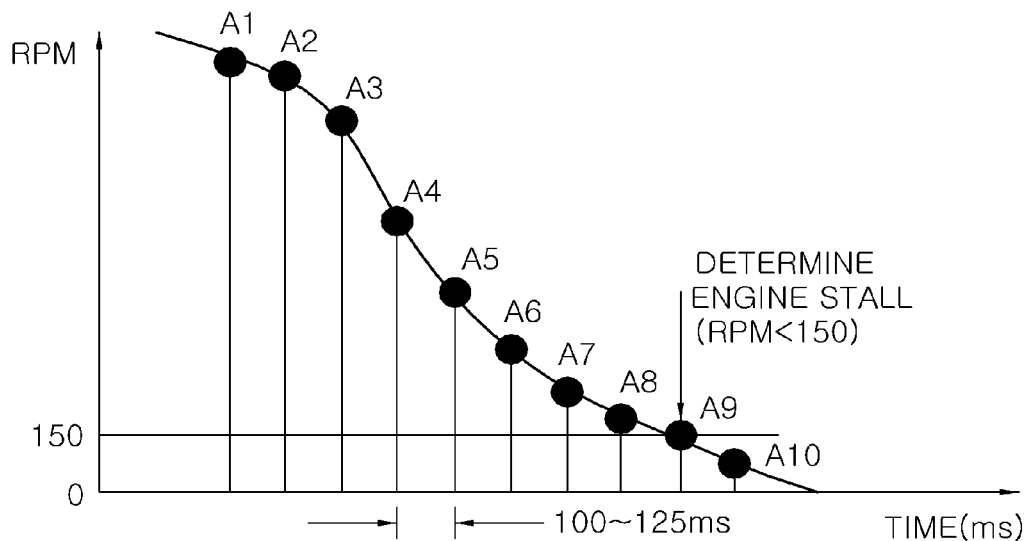

EXAMPLE OF 10 POINTS OF FIRST DIVISION RPM DATA

DATA STORAGE ITEMS: BATT. VOLTAGE, COOLING WATER TEMPERATURE, MAF OR MAP, BANK 1/2, FUEL TRIM (LONG / SHORT), O2 SENSOR (BANK 1/2), BRAKE INFORMATION, VEHICLE SPEED, APS_1/2 (%), TPS_1/2 (%), CLUTCH INFORMATION, A/C STATE, GEAR INFORMATION (P/R/N/D), GEAR LEVEL INFORMATION, COMMANDED THROTTLE ACTUATOR, DAMPER CLUTCH, INTAKE/EXHAUST CAM PHAZER POSITION, PURGE DUTY, PURGE CONCENTRATION, IGNITION TIMING, FUEL RAIL PRESSURE (FOR GDI ENGINE), A/F RATIO, MILEAGE

EXAMPLE OF VEHICLE DETECTION DATA

FIG.3

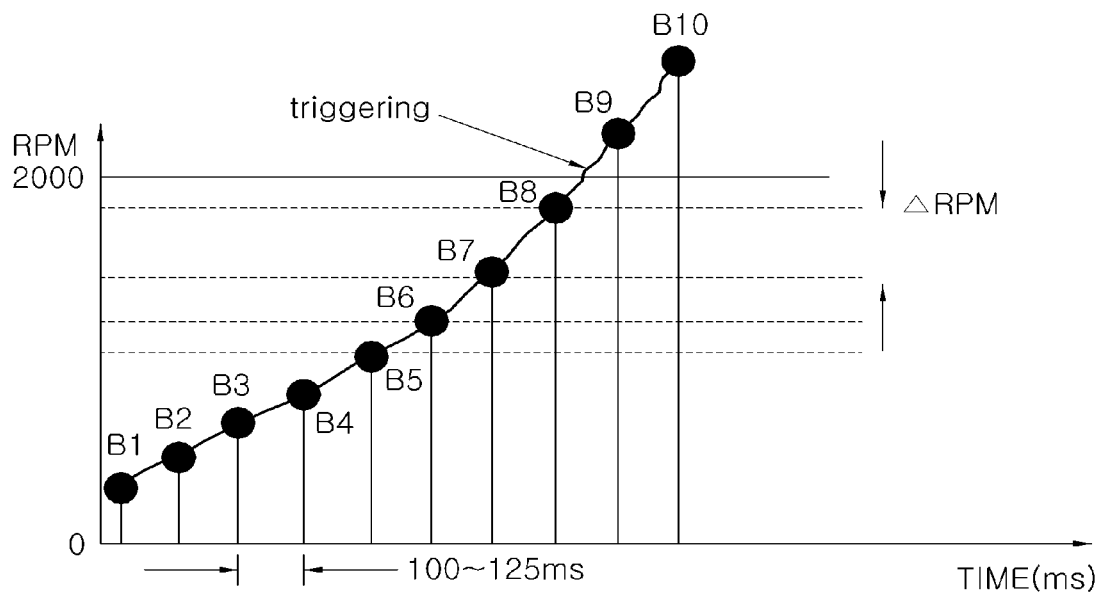

EXAMPLE OF 10 POINTS OF SECOND DIVISION RPM DATA

DATA STORAGE ITEMS: BATT. VOLTAGE, COOLING WATER TEMPERATURE, MAF OR MAP, BANK 1/2, FUEL TRIM (LONG / SHORT), O2 SENSOR (BANK 1/2), BRAKE INFORMATION, VEHICLE SPEED, APS_1/2 (%), TPS_1/2 (%), CLUTCH INFORMATION, A/C STATE, GEAR INFORMATION (P/R/N/D), GEAR LEVEL INFORMATION, COMMANDED THROTTLE ACTUATOR, DAMPER CLUTCH, INTAKE/EXHAUST CAM PHAZER POSITION, PURGE DUTY, PURGE CONCENTRATION, IGNITION TIMING, FUEL RAIL PRESSURE (FOR GDI ENGINE), A/F RATIO, MILEAGE

EXAMPLE OF VEHICLE DETECTION DATA

ENGINE RPM MONITORING METHOD USING MODE OF PRIORITY AND ENGINE RPM MONITORING CONTROLLER THEREFORE

CROSS-REFERENCE TO RELATED APPLICATIONS

This application claims priority to Korean Patent Application No. 10-2014-0084291, filed on Jul. 7, 2014, which is incorporated herein by reference in its entirety.

BACKGROUND

Field of the Invention

Exemplary embodiments of the present invention relate to engine revolutions per minute (RPM) monitoring (ERM), and more particularly, to a method for storing an occurrence order of engine stall and RPM sudden rise using priority and an ERM controller thereof.

Description of Related Art

Generally, a diagnostic trouble code (DTC) is data that records an error (failure) status which may occur while a vehicle is being driven and is used to determine failure causes of the vehicle during A/S due to the error of the vehicle. For example, a mechanic uses the data of the DTC during the A/S to determine whether the failure of the vehicle occurs due to an electric system, an engine/fuel system, or exchange components.

In particular, when the data of the DTC is used in a condition reproduction experiment of a power train to analyze the phenomenon of a sudden increase in the engine RPM, it may be more accurately determined that the phenomenon of the RPM sudden increase which does not conform to driver intention occurs due to an operation error of an accelerator pedal by a driver rather than a temporary control error of the power train. However, the DTC has a nature of a classified code which is referred to as a bundle of similar phenomena of the error (failure) status and thus cannot have a limitation in that all the error (failure) statuses of the vehicle may not diagnosed.

The example may include an engine stall phenomenon. The engine stall occurs by various causes such as an electric system and an engine/fuel system. In particular, the engine stall is due to the fact that the DTC needs to be built as a classified code which accurately classifies various causes of the engine stall. For example, it is understand that a cause capture rate using the DTC for capturing the causes of the engine stall is about 30% in the electric system and about 20% in the engine/fuel system. In spite of using the DTC, since the cause capture rate of the engine stall is substantially low, it may be difficult to perform A/S and unnecessary vehicle part maintenance may be caused, and as a result, may cause a reduction of marketability.

SUMMARY

An exemplary embodiment of the present invention provides an engine RPM monitoring method using a mode of priority and an engine RPM monitoring controller thereof configured to increase memory utilization by subdividing multiple data after and before RPM sudden increase and after and before engine stall by using a RPM-Time diagram and assigning priority to the engine stall to the RPM sudden increase to store data to which priority is assigned in the memory and in particular, capable of overcoming a limitation of a diagnostic trouble code (DTC) using the multiple data subdivided after and before the RPM sudden increase and after and before the engine stall to more accurately determine causes of the engine stall.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, an ERM method using a mode of priority may include: when engine monitoring is performed at the time of key on, determining engine stall and RPM sudden increase based on revolution per minute (RPM) of an engine; determining priority of first D_RPM Data associated with the engine stall and second D_RPM Data associated with the RPM sudden increase, storing prioritized one of the first D_RPM Data and the second D_RPM Data as new data of a memory; and deleting the previously stored data.

The engine monitoring may be vehicle detection data detected by sensors in an engine running state and may be recognized by an engine controller. The engine stall may be determined to be equal to or less than about 150 RPM and the RPM sudden increase may be determined to be equal to or greater than about 2000 RPM. The storing of ES_Data in the memory by the engine stall may include: (A-1) when the detected current RPM satisfies current RPM <A (stall RPM), determining that the engine is stalled; (A-2) defining the current RPM determined to be the engine stall as an engine stall data ES_Data; (A-3) determining a generation timing of the ES_Data using an RPM_Time diagram; (A-4) dividing RPM before the generation timing of the ES_Data and RPM after the generation timing of the ES_Data into the first D_RPM Data to be stored as new data of the memory; and (A-5) when the memory storage is completed, measuring a storage frequency of the first D_RPM Data by N=1 and then returning to the engine monitoring.

In the (A-4), the RPM before the generation timing of the first D_RPM Data may be divided into 8 stall RPMs A1 to A8, the RPM after the generation timing of the first D_RPM Data may be divided into stall RPMs A9-A0, and 10 intervals dividing the stall RPMs A1-A10 may be a time interval of about 100 to 125 ms. In the (A-4), when the first D_RPM Data is stored as the new data of the memory, the existing data stored in the memory may be deleted from the memory.

The storing of the ES_Data in the memory by the RPM sudden increase may include: (B-1) when the detected current RPM satisfies current RPM>B (threshold_1, threshold value of RPM sudden increase), determining that the RPM suddenly increase; (B-2) when the current RPM satisfies an RPM gradient (ΔRPM)>C (threshold_2, threshold value in defined time interval), being defined as RPM_Data, (B-3) determining a generation timing of the RPM_Data using an RPM_Time diagram; (B-4) dividing RPM before the generation timing of the RPM_Data and RPM after the generation timing of the RPM_Data into the second D_RPM Data to be stored as new data of the memory; and (B-5) when the memory storage is completed, returning to the engine monitoring when the engine stall does not occur.

In the (B-1), the determination of the RPM sudden increase may be when the frequency N showing the storing of the ES_Data in the memory due to the engine stall is less than 1 and when the frequency N is equal to 1, the ERM method may return to the engine monitoring. When current RPM>B (threshold_1, sudden rise RPM threshold value) is not satisfied in the (B-1) and when RPM gradient (ΔRPM) >C (threshold_2, threshold value at the defined time interval) is not satisfied in the (B-2), the ERM method may return to the engine monitoring. In the (A-4), the RPM before the generation timing of the second D_RPM may be divided into 8 sudden increase RPMs A1 to A8, the RPM after the generation timing of the second D_RPM Data may be divided into sudden increase RPMs B9-B0, and 10 intervals dividing the sudden increase RPMs B1-B10 may be a time interval of about 100 to 125 ms. In the (B-4), when the second D_RPM Data are stored as the new data of the memory, the existing data stored in the memory may be deleted. In the (B-5), when the engine stall occurs, the second D_RPM Data may be deleted from the memory and the third D_RPM Data may be again stored in the memory.

The process of again storing the third D_RPM Data in the memory may include: (C-1) defining the current RPM determined as the engine stall as the engine stall data ES_Data, (C-2) determining the generation timing of the ES_Data using the RPM-Time diagram, (C-3) dividing the RPM before the generation timing of the ES_Data and the RPM after the generation timing of the ES_Data as the third D_RPM Data to be stored as new data of the memory, and (C-4) when the memory storage is completed, again measuring the storage frequency of the third D_RPM Data by N=1 and then returning to the engine monitoring.

In accordance with another exemplary embodiment of the present invention, an ERM controller may include: a switching determiner configured to switch an existing memory storage value to a new memory storage value to be output as a memory storage signal when any one of first D_RPM Data associated with engine stall, second D_RPM Data associated with RPM sudden increase, and third D_RPM Data associated with the engine stall after the RPM sudden increase is input as new memory storage value by monitoring an engine running state; and an engine RPM monitoring data memory configured to delete previously stored data and store the new memory storage value when the memory storage signal is input. The ERM data memory may be differentiated from a vehicle detection data memory and the vehicle detection data memory may be stored with the vehicle detection data detected in the engine running state. The switching determiner and the ERM data memory may be included in an engine control unit (ECU).

BRIEF DESCRIPTION OF THE DRAWINGS

The above and other objects, features and advantages of the present invention will be more apparent from the following detailed description taken in conjunction with the accompanying drawings, in which:

FIG. 2 is an exemplary diagram of first division RPM Data storage at the time of engine stall in accordance with an exemplary embodiment of the present invention;

FIG. 3 is an exemplary diagram illustrating second division RPM Data during RPM sudden increase in accordance with an exemplary embodiment of the present invention;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
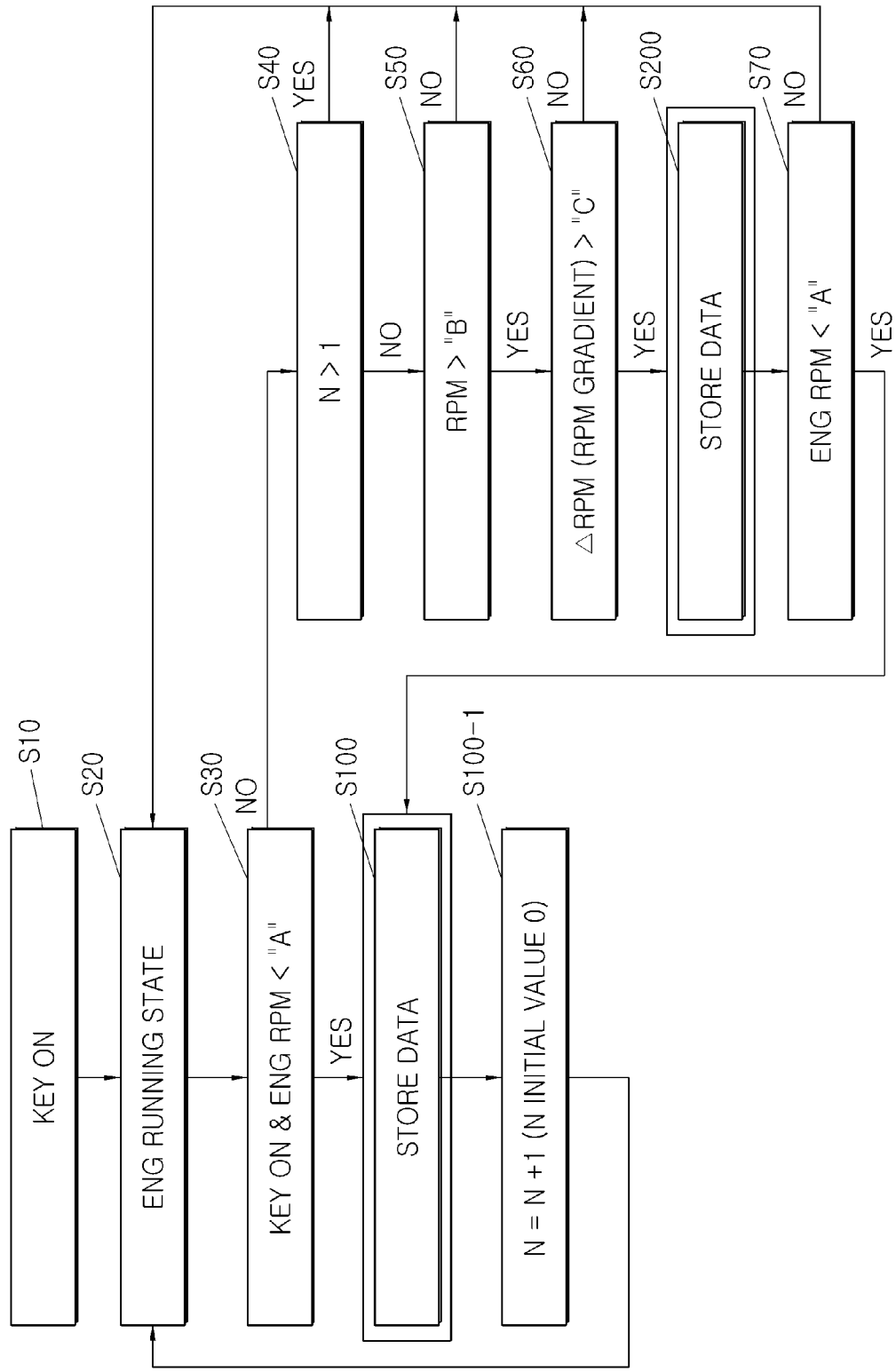
FIG. 1 is an exemplary flow chart of an engine RPM monitoring method using a mode of priority in accordance with an exemplary embodiment of the present invention.

FIG. 1 is an exemplary flow chart of an engine RPM monitoring (hereinafter, referred to as ERM) method using a mode of priority in accordance with an exemplary embodiment of the present invention. The ERM method using a method of priority may be performed by an ERM controller, but may be performed by an engine controller or an electronic controller.

In S10, when a key on for engine starting is sensed, in S20, an engine running state (hereinafter, referred to as ERS) may be monitored. In particular, the ERS monitoring may target vehicle detection data (hereinafter, referred to as VD Data). For example, the VD Data may include battery voltage, cooling water temperature, MAF (or MAP), bank 1/2, fuel trim (long/short), an oxygen sensor (O2 sensor (bank 1/2)), brake information, vehicle speed, an accelerator pedal (APS_1/2 (%)), throttle (TPS_1/2 (%)), clutch information, an air conditioner (A/C state), gear information (P/R/N/D), gear level information, a commanded throttle actuator (CTA), a damper clutch, an intake/exhaust cam phazer position, purge (purge duty, purge concentration), ignition timing, fuel rail pressure (GDI engine), a mixing ratio (A/F ratio), mileage, and the like.

When a VDD confirmation is performed by the ERS monitoring of S20, in S30, a priority ERM mode may be performed. The priority ERM mode may define priority for engine stall data (hereinafter, referred to as ES_Data) storage of S100 stored in a memory and RPM sudden increase data (hereinafter, referred to as RPM_Data) storage of S200, may be configured to store first division RPM Data (hereinafter, referred to as first D_RPM Data) among the ES_Data of S100 or store second division RPM Data (hereinafter, referred to as second D_RPM Data) among the RPM_Data of S200, based on the defined priority, and change the storage priority of the first D_RPM Data and second D_RPM Data when a switching condition is satisfied by continuously confirming the VDD. In particular, the switching condition may be the engine stall and the RPM sudden increase and priority may be assigned to the engine stall.

Accordingly, in the priority ERM mode of S30, the engine stall may be first determined by the key on/engine RPM (ENG RPM). The engine stall may be configured to apply current RPM<A (stall RPM), in which the A (stall RPM) may be about 150 RPM or less. Therefore, in S30, when current RPM<A (stall RPM) is satisfied, when the ERS is determined as the engine stall, the ERM method may be configured to enter ES_Data storage of S100. In S100, the data storage that includes VD Data and the first D_RPM Data may be performed. In particular, the first D_RPM Data may be assigned with priority and thus the second D_RPM Data stored in the storage memory may be deleted. When the data storage of S100 is completed, a storage frequency of the first D_RPM Data may be detected as in S100-1 and then the ERM method may return to ERS monitoring.

FIG. 2 illustrates an example of the VD Data and the first D_RPM Data. As illustrated, the VD Data may include battery voltage, cooling water temperature, MAF (or MAP), bank 1/2, fuel trim (long/short), an oxygen sensor (O2 sensor (bank 1/2)), brake information, vehicle speed, an accelerator pedal (APS_1/2 (%)), throttle (TPS_1/2 (%)), clutch information, an air conditioner (A/C state), gear information (P/R/N/D), gear level information, a commanded throttle actuator (CTA), a damper clutch, an intake/exhaust cam phazer position, purge (purge duty, purge concentration), ignition timing, fuel rail pressure (GDI engine), a mixing ratio (A/F ratio), mileage, and the like.

In particular, the first D_RPM Data may be information for more accurately analyzing the causes of the engine stall and therefore related data after and before the occurrence of stall during the engine stall may be stored. Accordingly, the first D_RPM Data may use the RPM-Time diagram and thus the RPM after and before the stall may be divided into 10 stall RPMs P1 to P10. For example, 10 stall RPMs A1 to A10 may be divided into 8 stall RPMs A1 to A8 before the stall and 2 stall RPMs A9-A10 and a time interval may be set to be about 100 to 125 ms.

Furthermore, in S30, when current RPM<A (stall RPM) is not satisfied, the ERS may not be determined as the engine stall, and thus the ERM method may proceed to S40 to perform a determination for RPM_Data storage. In S40, a frequency N regarding whether the data of S100 due to the engine stall is stored may be confirmed and when N>1 due to the data storage, the ERM method may return to the ERS monitoring of S20, while when N<1, the ERM method proceeds to S50.

In S50, a first RPM sudden increase condition may be determined. The first RPM sudden increase condition may apply current RPM>B (threshold_1), in which the B (threshold_1) may be about 2000 RPM/Idle_P_TPS at a throttle idle position. Further, in S50, when current RPM>B (threshold_1) is satisfied, the ERM method may proceed S60 to determine a second RPM sudden increase condition. The second RPM sudden increase condition may apply RPM gradient (ΔRPM)>C (threshold_2), in which the C (threshold_2) may be a threshold value of the RPM gradient at a defined time interval. Generally, the C (threshold_2) may have a substantially high gradient value compared to other intervals.

Therefore, in S60, when RPM gradient (ΔRPM)>C (threshold_2) is satisfied, when the ERS is determined as the RPM sudden increase, the ERM method may proceed to the data storage of S200. In S200, the data storage including VD Data and the second D_RPM Data may be performed. In particular, the second D_RPM Data may be assigned with priority and thus the first D_RPM Data stored in the storage memory may be deleted. Next, when the data storage of S200 is completed, as in S70, the priority ERM mode may again be detected and thus the ERM method may confirm that the engine stall does not occur and then return to the ERS monitoring.

FIG. 3 illustrates an example of the VD Data and the second D_RPM Data. As illustrated in FIG. 3, the VD Data is the same as the case of FIG. 2. Further, the second D_RPM Data may be information for more accurately analyzing a cause of the RPM sudden increase, and therefore the related data after and before the generation of RPM gradient (ΔRPM)>C (threshold_2) at current RPM>B (threshold_1) [2000 RPM/Idle_P_TPS] may be stored. Accordingly, the second D_RPM Data may use the RPM-Time diagram and thus the RPM after and before the occurrence of the RPM sudden increase may be divided into about 10 sudden increase RPMs B1 to B10. For example, the 10 sudden increase RPMs B1 to B10 may be divided into 8 sudden increase RPMs B1 to B8 before the generation of the RPM and 2 sudden increase RPMs B9-B10 after the generation of the RPM and a time interval may be set to be about 100 to 125 ms.

However, when current RPM<A (stall RPM) is satisfied by again detecting the priority ERM mode of S70, when the ERS is determined as the engine stall, the ERM method may proceed to the ES_Data storage of S100 and thus may proceed to the generation process of the same third D_RPM Data as the first D_RPM Data. In particular, the third D_RPM Data may have priority higher than that of the second D_RPM Data stored in the storage memory and therefore the second D_RPM Data may be deleted from the storage memory and the third D_RPM Data may be stored in the memory. When the data storage of S100 is completed, a storage frequency of the third D_RPM Data may again be detected as in S100-1 and then the ERM method may return to ERS monitoring. In particular, the third D_RPM Data is another definition of the first D_RPM Data and therefore all the third D_RPM Data are the same as the first D_RPM Data.

Figure 4:
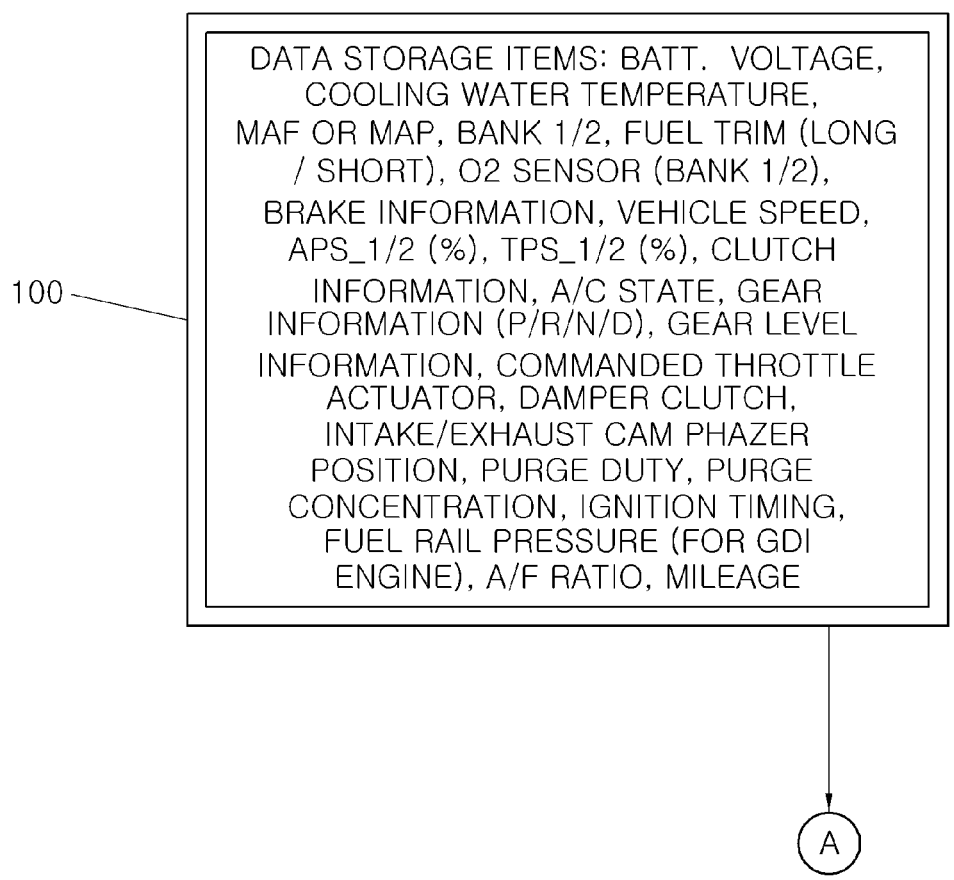
FIG. 4 and FIG. 5 are exemplary configuration diagrams of an ERM controller performing the engine RPM monitoring method using a mode of priority in accordance with an exemplary embodiment of the present invention.
Figure 5:
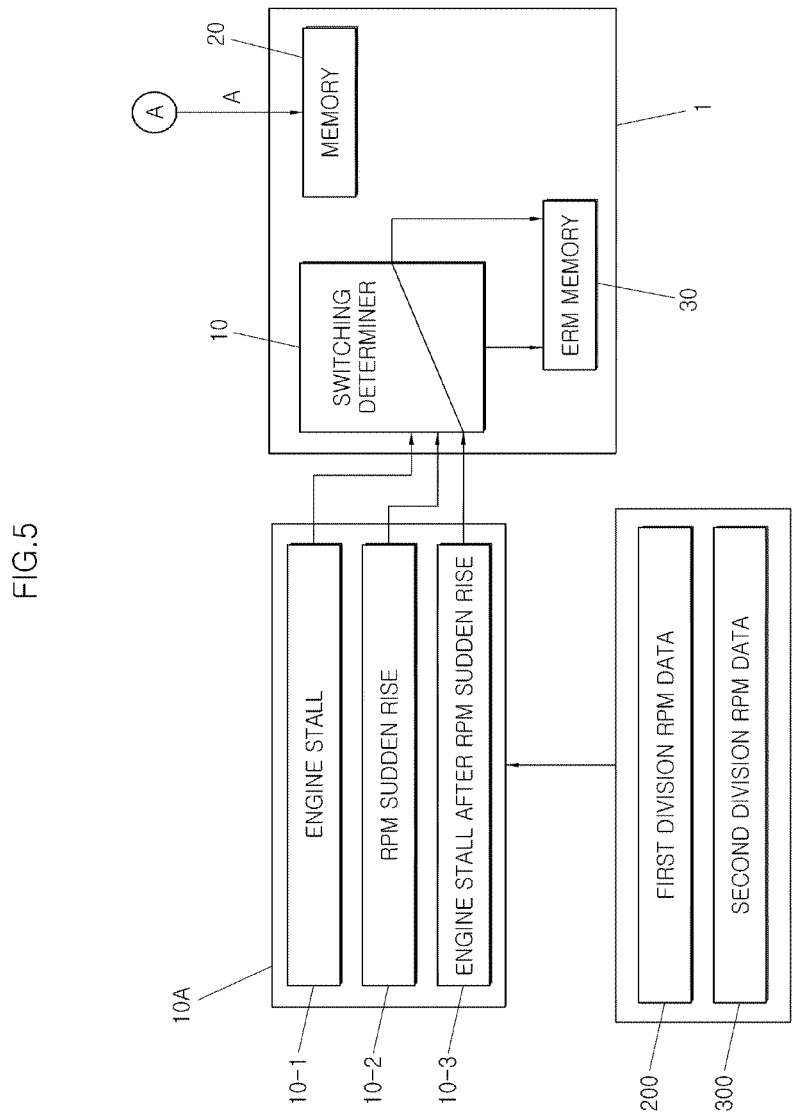

Meanwhile, FIGS. 4, 5, 6 and 7 illustrate the configuration and the running state of the engine RPM monitoring controller (ERM) configured to execute the ERM monitoring method using a mode of priority in accordance with the exemplary embodiment of the present invention. Referring to FIG. 4 and FIG. 5, the ERM controller 1 may include a switching determiner 10, a vehicle detection data memory (hereinafter, referred to as VD_Data memory) 20, and an engine RPM monitoring data memory (hereinafter, referred to as ERM_Data memory) 30.

The switching determiner 10 may be configured to receive switching ERM data 10A and the switching ERM data 10A may include an engine stall entry signal 10-1, an RPM sudden increase entry signal 10-2, and an engine stall reentry signal 10-3. The engine stall entry signal 10-1 may be provided as the first division RPM Data (hereinafter, referred to as first D_RPM Data) 200, the RPM sudden increase entry signal 10-2 may be provided as the second division RPM Data (hereinafter, referred to as second D_RPM Data) 300, and the engine stall reentry signal 10-3 may be provided as the first D_RPM Data 200. The first D_RPM Data 200 may be 8 stall RPMs A1 to A8 before the stall and 2 stall RPMs A9 to A10 after the stall, which may have the time interval of about 100 to 125 ms described in FIG. 2. The second D_RPM Data 300 may be 8 sudden increase RPMs B1 to B8 before the RPM and 2 sudden increase RPMs B9 to B10 after the RPM, which may have the time interval of about 100 to 125 ms described in FIG. 3.

The VD_Data memory 20 may be configured to receive the vehicle detection data (hereinafter, referred to as VD_Data) 100 as the storage information A at the time of the data storage step of S100 or the data storage step of S200 described in FIGS. 1 to 3. The VD Data may be vehicle information detected during the monitoring of the engine running state and may include battery voltage, cooling water temperature, MAF (or MAP), bank 1/2, fuel trim (long/short), an oxygen sensor (O2 sensor (bank 1/2)), brake information, vehicle speed, an accelerator pedal (APS_1/2 (%)), throttle (TPS_1/2 (%)), clutch information, an air conditioner (A/C state), gear information (P/R/N/D), gear level information, a commanded throttle actuator (CTA), a damper clutch, an intake/exhaust cam phazer position, purge (purge duty, purge concentration), ignition timing, fuel rail pressure (GDI engine), a mixing ratio (A/F ratio), mileage, and the like. The ERM_Data memory 30 may be configured to one having priority among the first D_RPM Data 200 or the second D_RPM Data 300. Therefore, the ERM_Data memory 30 may be linked with the switching output which may be performed by the switching determiner 10.

Figure 6:
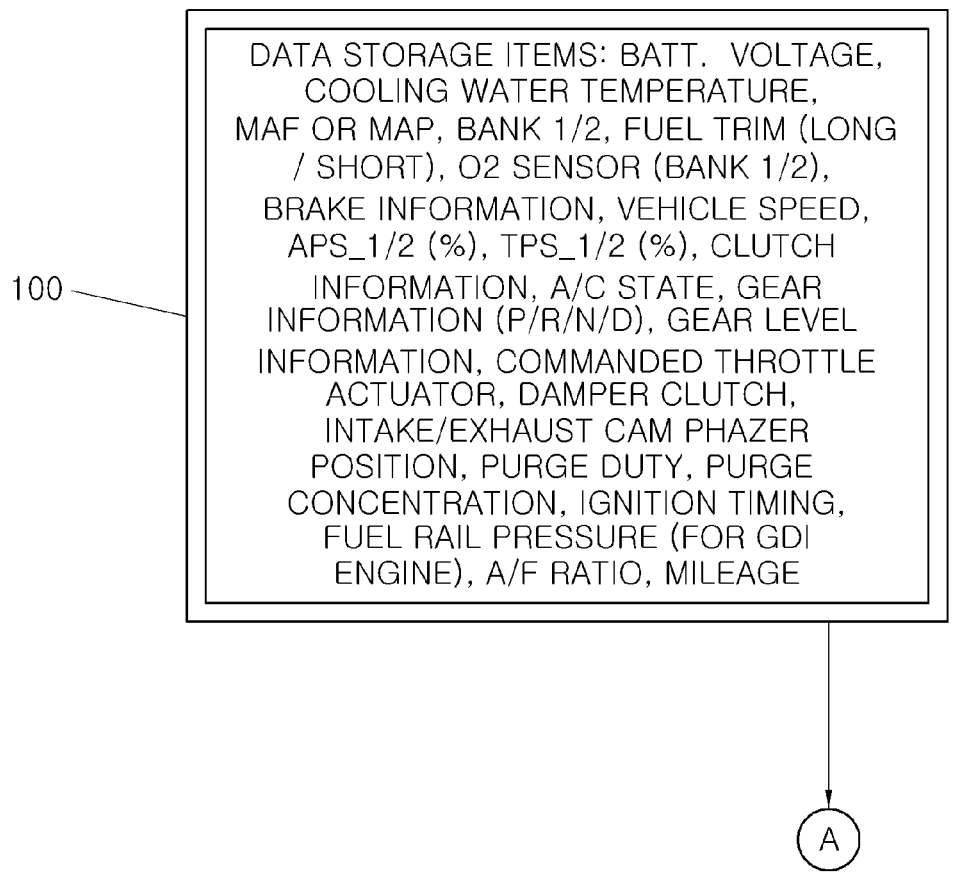
FIG. 6 and FIG. 7 are exemplary diagrams illustrating a running state of the ERM controller in accordance with the exemplary embodiment of the present invention during the engine stall and the RPM sudden increase and the engine stall after the RPM sudden increase.
Figure 7:
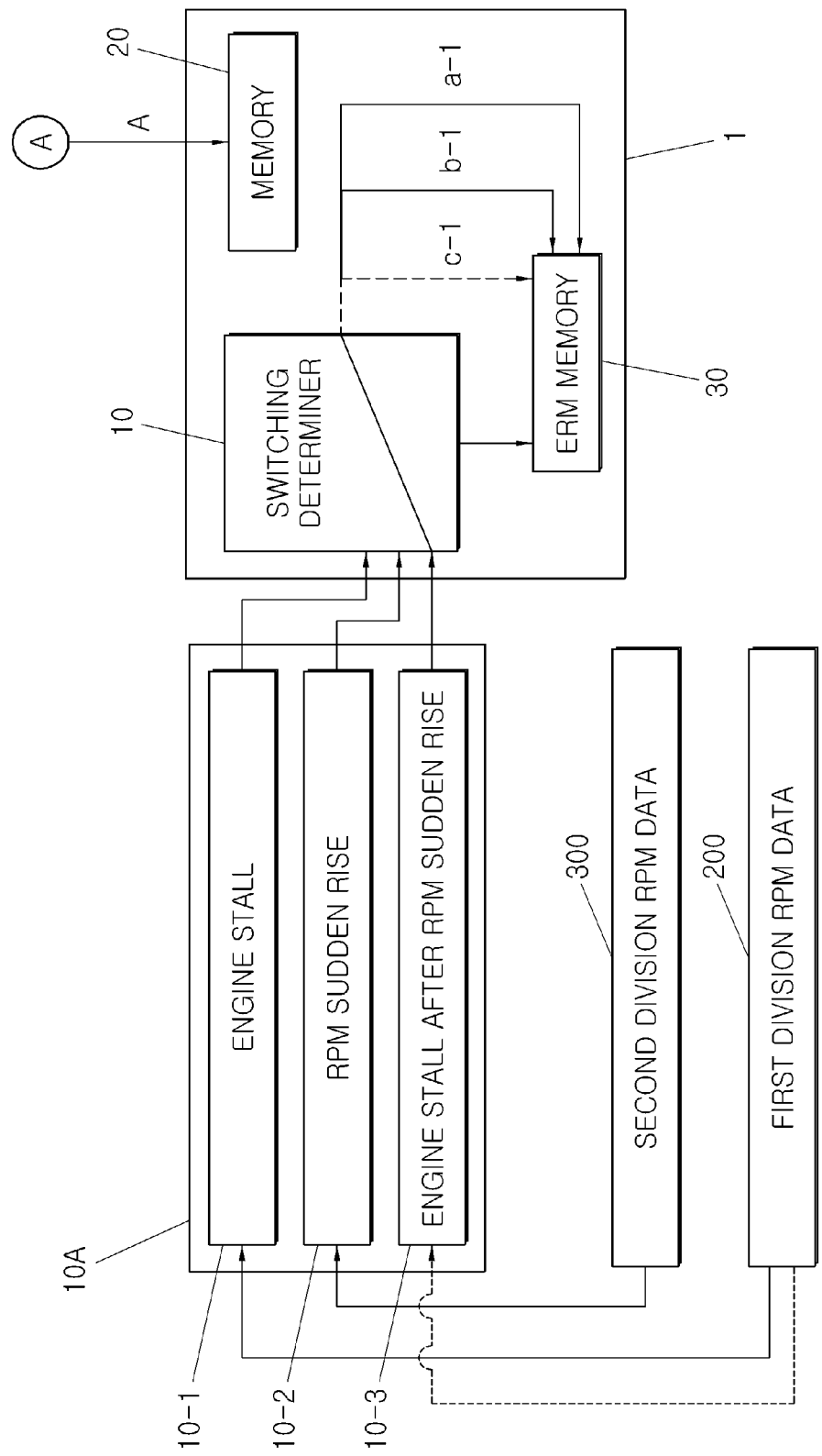

Referring to FIG. 6 and FIG. 7, when the switching determiner 10 receives an engine stall entry signal 10-1, the switching determiner 10 may be configured to output the first switching signal a-1 among first, second, and third switching signals a-1, b-1, and c-1 and the ERM_Data memory 30 may be configured to store the first D_RPM Data 200 input to the first switching signal a-1. In particular, the existing data stored in the ERM_Data memory 30 may be deleted. This is the same as the data storage of S100 described in FIGS. 1 to 3.

Further, when the switching determiner 10 receives an RPM sudden increase entry signal 10-2, the switching determiner 10 may be configured to output the second switching signal b-1 among the first, second, and third switching signals a-1, b-1, and c-1 and the ERM_Data memory 30 may be configured to store the second D_RPM Data 300 input to the second switching signal b-1. In particular, the existing data (e.g., first D_RPM Data 200) stored in the ERM_Data memory 30 may be deleted. This is the same as the data storage of S200 described in FIGS. 1 to 3.

Further, when the switching determiner 10 receives an engine stall reentry signal 10-3, the switching determiner 10 may be configured to output the third switching signal c-1 among the first, second, and third switching signals a-1, b-1, and c-1 and the ERM_Data memory 30 may be configured to store the first D_RPM Data 200 input to the third switching signal b-1. In particular, the existing data (e.g., second D_RPM Data 300) stored in the ERM_Data memory 30 may be deleted. This is the same as the data storage of S200 described in FIGS. 1 to 3.

Accordingly, the ERM_Data memory 30 may use the first, second, and third switching signals a-1, b-1, and c-1 of the switching determiner 10 to store one having priority among the first D_RPM Data 200 and the second D_RPM Data 300, such that the ERM controller having high memory utilization may be implemented. In particular, the ERM controller 1 may be configured as a dedicated controller for ERM but the engine controller or the electronic controller (hereinafter, referred to as ECU) may be applied. In particular, the memory utilization of the ERM_Data memory 30 may be more contributed to the expansion of the ECU utilization.

As described above, in accordance with the ERM method using a mode of priority in accordance with the exemplary embodiment of the present invention, when the engine monitoring is performed during the key on, the engine stall and the RPM sudden increase may be determined based on the revolution per minute (RPM) of the engine, the storage priority decision of the first D_RPM Data associated with the engine stall and the second D_RPM Data associated with the RPM sudden increase may be performed, a prioritized of the first D_RPM Data and the second D_RPM Data may be stored as new data of the engine RPM monitoring data memory 300, the utilization of the ERM data memory may be substantially increased by deleting the previously stored data, and in particular, the second D_RPM Data B1-B10 and the first D_RPM Data A1-A10 subdivided after and before the RPM sudden increase and after and before the engine stall may be used to more accurately determine the causes of the engine stall to overcome the limitation of the diagnostic trouble code (DTC).

In accordance with the exemplary embodiments of the present invention, it may be possible to overcome the limitation of the diagnostic trouble code (DTC), in particular, more accurately analyze the causes of the engine stall of the engine stall, by storing data associated with the engine stall and the RPM sudden increase due to the change in RPM in the ERM controller (or ECU) based on the generation order of data as priority using the engine RPM monitoring method.

Further, in accordance with the exemplary embodiment of the present invention, it may be possible to increase the memory utilization of the ECU, in particular, no change in the hardware is required such as the memory expansion of the ECU by dividing multiple data after and before the RPM sudden increase and after and before the engine stall using the RPM-Time diagram and storing the multiple data in the memory of the ECU one by one. Additionally, it may be possible to improve the diagnosis accuracy of the engine stall of the electric system and the engine/fuel system without any improvement of the DTC capable of diagnosing the error (failure) status which may occur during the driving of the vehicle.

Moreover, it may be possible to solve the problem of the unnecessary vehicle part maintenance for the cause analysis by performing the A/S due to the improvement in the diagnosis accuracy of the engine stall and prevent reduction of marketability by rapidly analyzing and coping with the causes of the engine stall.

Further, in accordance with the exemplary embodiments of the present invention, it may be possible to provide the basis of the AS measures for the main field problems, utilize the internal data analysis of the ECU, secure the basis of the measure for the customer claim vehicle, by building the data used for the more accurate cause diagnosis of the engine stall and the RPM sudden increase as the data base, in particular, improve the efficiency of the measure for the field problems of the developed vehicle by previously analyzing the vehicle with the problem based on the data analysis of the vehicle with the field problem using the built DB prior to detecting the vehicle with the problem. In addition, it may be possible to further improve the utilization of the engine controller by using the engine controller or the electronic controller as the controller that performs the logic of the engine RPM monitoring method.

The foregoing exemplary embodiments are merely examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. An engine revolutions per minute monitoring (ERM) method using a mode of priority, comprising:
    determining, by a controller, engine stall and RPM sudden increase based on revolution per minute (RPM) of an engine when engine monitoring is performed during a key on;
    determining, by the controller, a priority of first D_RPM Data associated with the engine stall and second D_RPM Data associated with the RPM sudden increase;
    storing, by the controller, the prioritized one of the first D_RPM Data and the second D_RPM Data as new data of a memory; and
    deleting, by the controller, the previously stored data at the time of storage,
    wherein the controller consists of a switching determiner configured to switch an existing memory storage value to a new memory storage value to be output as a memory storage signal when any one of the first $D_{13}$ RPM Data associated with the engine stall, the second D_RPM Data associated with the RPM sudden increase, and a third D_RPM Data associated with the engine stall after the RPM sudden increase is input as new memory storage by monitoring an engine running state; and an engine RPM monitoring data memory configured to delete previously stored data and store the new memory storage value when the memory storage signal is input.

2. The ERM method using a mode of priority of claim 1, wherein the engine monitoring is vehicle detection data detected by sensors in an engine running state.

3. The ERM method using a mode of priority of claim 1, wherein the engine stall is determined to be equal to or less than about 150 RPM and the RPM sudden increase is determined to be equal to or greater than about 2000 RPM.

4. The ERM method using a mode of priority of claim 1, wherein the storing of ES_Data in the memory by the engine stall includes:
    (A-1) determining, by the controller, that the engine is stalled when the detected current RPM satisfies current RPM<A (stall RPM);
    (A-2) defining, by the controller, the current RPM determined to be the engine stall as an engine stall data ES_Data;
    (A-3) determining, by the controller, a generation timing of the ES_Data using an RPM_Time diagram;
    (A-4) dividing, by the controller, RPM before the generation timing of the ES_Data and RPM after the generation timing of the ES_Data into the first D_RPM Data to be stored as new data of the memory; and
    (A-5) when the memory storage is completed, measuring, by the controller, a storage frequency of the first D_RPM Data by N=1 and then returning to the engine monitoring.

5. The ERM method using a mode of priority of claim 4, wherein in the (A-4), the RPM before the generation timing of the first D_RPM Data is divided into 8 stall RPMs A1 to A8, the RPM after the generation timing of the first D_RPM Data is divided into stall RPMs A9-A 0, and 10 intervals dividing the stall RPMs A1-A10 are a time interval of about 100 to 125 MS.

6. The ERM method using a mode of priority of claim 4, wherein in the (A-4), when the first D_RPM Data is stored as the new data of the memory, the existing data stored in the memory is deleted.

7. The ERM method using a mode of priority of claim 1, wherein the storing of the ES_Data in the memory by the RPM sudden increase includes:
    (B-1) determining, by the controller, that the RPM suddenly rises when the detected current RPM satisfies current RPM>B (threshold_1, threshold value of RPM sudden rise);
    (B-2) when the current RPM satisfies an RPM gradient (ARPM)>C (threshold_2, threshold value in defined time interval), being defined as RPM_Data,
    (B-3) determining, by the controller, a generation timing of the RPM_Data using an RPM_Time diagram;
    (B-4) dividing, by the controller, RPM before the generation timing of the RPM_Data and RPM after the generation timing of the RPM_Data into the second D_RPM Data to be stored as new data of the memory; and
    (B-5) when the memory storage is completed, returning, by the controller, to the engine monitoring when the engine stall does not occur.

8. The ERM method using a mode of priority of claim 7, wherein in the (B-1), the determination of the RPM sudden increase is when the frequency N showing the storing of the ES_Data in the memory due to the engine stall is less than to 1 and when the frequency N is equal to 1, the ERM method returns to the engine monitoring.

9. The ERM method of claim 7, wherein when current RPM>B (threshold_, sudden rise RPM threshold value) is not satisfied in the (B-1) and when RPM gradient (ARPM)

>C (threshold_2, threshold value at the defined time interval) is not satisfied in the (B-2), the ERM method returns to the engine monitoring.

10. The ERM method using a mode of priority of claim 7, wherein in the (B-4), the RPM before the generation timing of the second D_RPM Data is divided into 8 sudden increase RPMs B1 to B8, the RPM after the generation timing of the second D_RPM Data is divided into sudden increase RPMs B9-B0, and 10 intervals dividing the sudden increase RPMs B1-B10 are a time interval of about 100 to 125 ms.

11. The ERM method using a mode of priority of claim 7, wherein in the (B-4), when the second D_RPM Data are stored as the new data of the memory, the existing data stored in the memory is deleted.

12. The ERM method using a mode of priority of claim 7, wherein in the (B-5), when the engine stall occurs, the second D_RPM Data is deleted from the memory and the third D_RPM Data is stored in the memory.

13. The ERM method using a mode of priority of claim 12, wherein the process of storing the third D_RPM Data in the memory includes:
   (C-1) defining, by the controller, the current RPM determined as the engine stall as the engine stall data ES_Data;
   (C-2) determining, by the controller, the generation timing of the ES_Data using the RPM-Time diagram;
   (C-3) dividing, by the controller, the RPM before the generation timing of the ES_Data and the RPM after the generation timing of the ES_Data as the third D_RPM Data to be stored as new data of the memory; and
   (C-4) when the memory storage is completed, measuring, by the controller, the storage frequency of the third D_RPM Data by N=1 and then returning to the engine monitoring.

14. An engine revolutions per minute monitoring (ERM) controller, comprising:
   a switching determiner configured to switch an existing memory storage value to a new memory storage value to be output as a memory storage signal when any one of a first D_RPM Data associated with engine stall, a second D_RPM Data associated with RPM sudden increase, and a third D_RPM Data associated with the engine stall after the RPM sudden increase is input as new memory storage value by monitoring an engine running state; and
   an engine RPM monitoring data memory configured to delete previously stored data and store the new memory storage value when the memory storage signal is input.

15. The ERM controller of claim 14, wherein the ERM data memory is differentiated from a vehicle detection data memory and the vehicle detection data memory is stored with the vehicle detection data detected in the engine running state.

16. The ERM controller of claim 14, wherein the switching determiner and the ERM data memory are included in an engine controller (ECU).

17. A non-transitory computer readable medium containing program instructions executed by a controller, the computer readable medium comprising:
   program instructions that determine engine stall and RPM sudden increase based on revolution per minute (RPM) of an engine when engine monitoring is performed during a key on;
   program instructions that determine a priority of first D_RPM Data associated with the engine stall and second D_RPM Data associated with the RPM sudden increase;
   program instructions that store the prioritized one of the first D_RPM Data and the second D_RPM Data as new data of a memory; and
   program instructions that delete the previously stored data at the time of storage.

18. The non-transitory computer readable medium of claim 17, wherein the engine stall is determined to be equal to or less than about 150 RPM and the RPM sudden increase is determined to be equal to or greater than about 2000 RPM.

* * * * *